US012009978B2

(12) United States Patent
Magaldi et al.

(10) Patent No.: US 12,009,978 B2
(45) Date of Patent: Jun. 11, 2024

(54) NETCONF BASED ALARM MANAGEMENT FOR PASSIVE OPTICAL NETWORK

(71) Applicant: ARRIS Enterprises LLC, Suwanee, GA (US)

(72) Inventors: Robert S. Magaldi, North Andover, MA (US); Karthik R. Rajalingari, Cupertino, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 63 days.

(21) Appl. No.: 17/959,603

(22) Filed: Oct. 4, 2022

(65) Prior Publication Data
US 2024/0007352 A1   Jan. 4, 2024

Related U.S. Application Data

(60) Provisional application No. 63/358,020, filed on Jul. 1, 2022.

(51) Int. Cl.
*H04L 41/0873* (2022.01)
*H04B 10/27* (2013.01)
*H04L 41/0631* (2022.01)

(52) U.S. Cl.
CPC ......... *H04L 41/0873* (2013.01); *H04B 10/27* (2013.01); *H04L 41/0631* (2013.01)

(58) Field of Classification Search
None
See application file for complete search history.

(56) References Cited

U.S. PATENT DOCUMENTS

2010/0040363 A1\* 2/2010 Zhou ................ H04B 10/07953
398/10

OTHER PUBLICATIONS

S. Vallin, "A YANG Data Model for Alarm Management (RFC8632)", Sep. 12, 2019, Internet Society RFC, All Pages (Year: 2019).\*
Andr'e Berti Sassi, "Integrated management of 10G-PON network element using NETCONF and OpenFlow", 2014, IEEE, All Pages (Year: 2014).\*

\* cited by examiner

*Primary Examiner* — Pranesh K Barua
(74) *Attorney, Agent, or Firm* — Chernoff, Vilhauer, McClung & Stenzel, LLP

(57) ABSTRACT

A system for NETCONF based alarm management for a PON network.

8 Claims, 10 Drawing Sheets

Notification Wrapper For A Normalized Alarm Message

| OLT Name: VOLT-BOSTON-22 |
|---|
| Notification:<br><br><notification xmlns="urn:ietf:params:xml:ns:netconf:notification:1.0"><br><br>    <eventTime>2019-08-26T08:51:05Z</eventTime><br><br>    <alarm-notification xmlns="urn:ietf:params:xml:ns:yang:ietf-alarms"><br><br>    .... |

*FIG. 10*

NETCONF BASED ALARM MANAGEMENT FOR PASSIVE OPTICAL NETWORK

CROSS REFERENCE TO RELATED APPLICATIONS

This application claims the benefit of U.S. Provisional Patent Application Ser. No. 63/358,020 filed Jul. 1, 2022.

BACKGROUND

The subject matter of this application relates to NETCONF based alarm management for a passive optical network.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibers and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are time division multiplexed to the feeder fiber 17, and similarly time division multiplexed to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which:

FIG. 10 illustrates a notification wrapper for a normalized alarm message.

DETAILED DESCRIPTION

Figure 1:
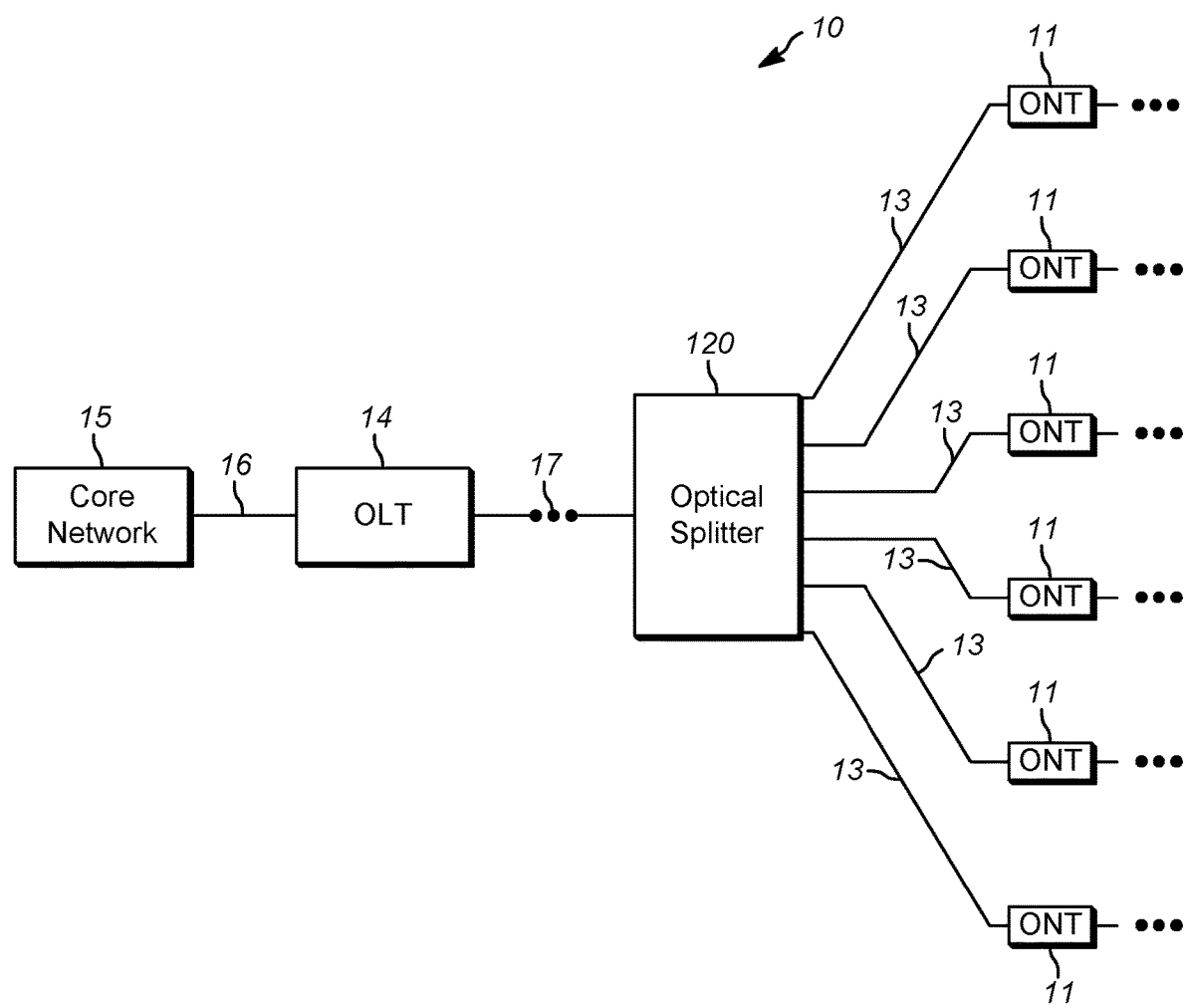
FIG. 1 illustrates a network that includes a passive optical network.
Figure 2:
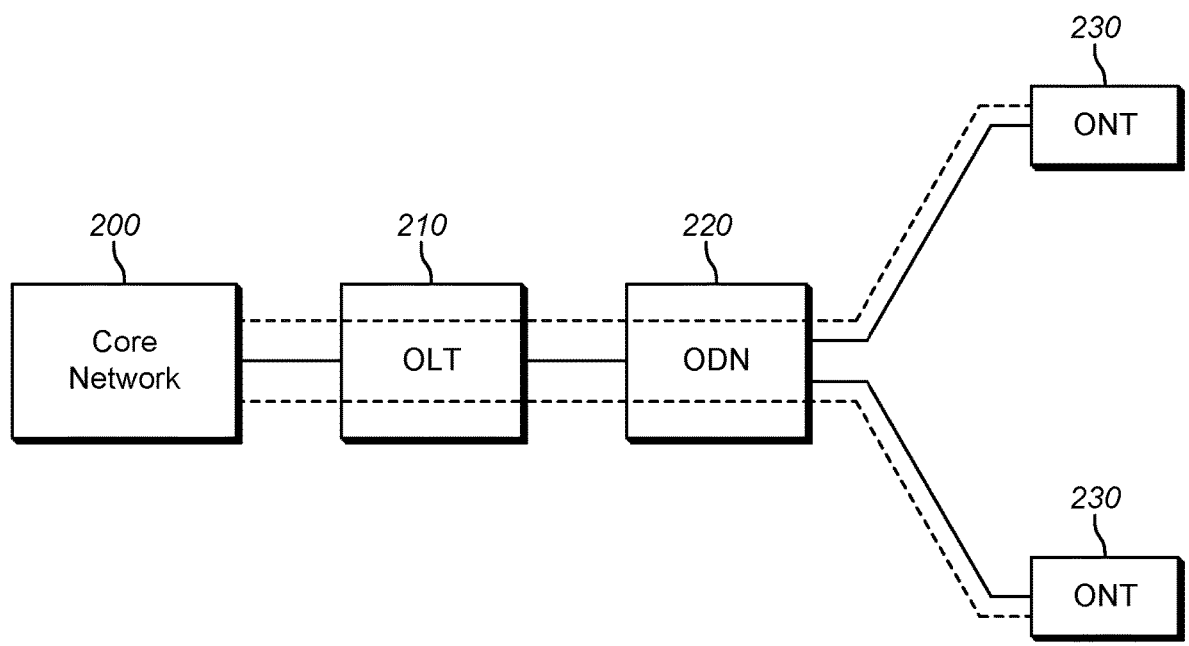
FIG. 2 illustrates a messaging path for a network that includes a core network, an optical line terminal, and a plurality of optical network terminals.

Referring to FIG. 2, the core network and/or the optical line terminals provides signaling with ONTs by using any suitable transmission protocols, such as optical network unit management and control interface (OMCI) messages over an ONT management and control channel ("OMCC"). The core network 200 and the OLT 210 with which it provides data to and receives data from, transmits data and receives data using a PON protocol over an optical distribution network (e.g., optical splitters, etc.) 220. The OLT 210 passes data through the optical distribution network (ODN) 220 to the ONTs 230, and receives data through the optical distribution network (ODN) 220 from the ONTs 230. The messages between the OLT 210 and the ONTs 230 are likewise provided between the OLT 210 and the ONTs 230 through the ODN 220. The ONTs 230 provides access network line termination, a user network interface line termination for subscriber devices, and service multiplexing and de-multiplexing for subscriber devices.

Figure 3:
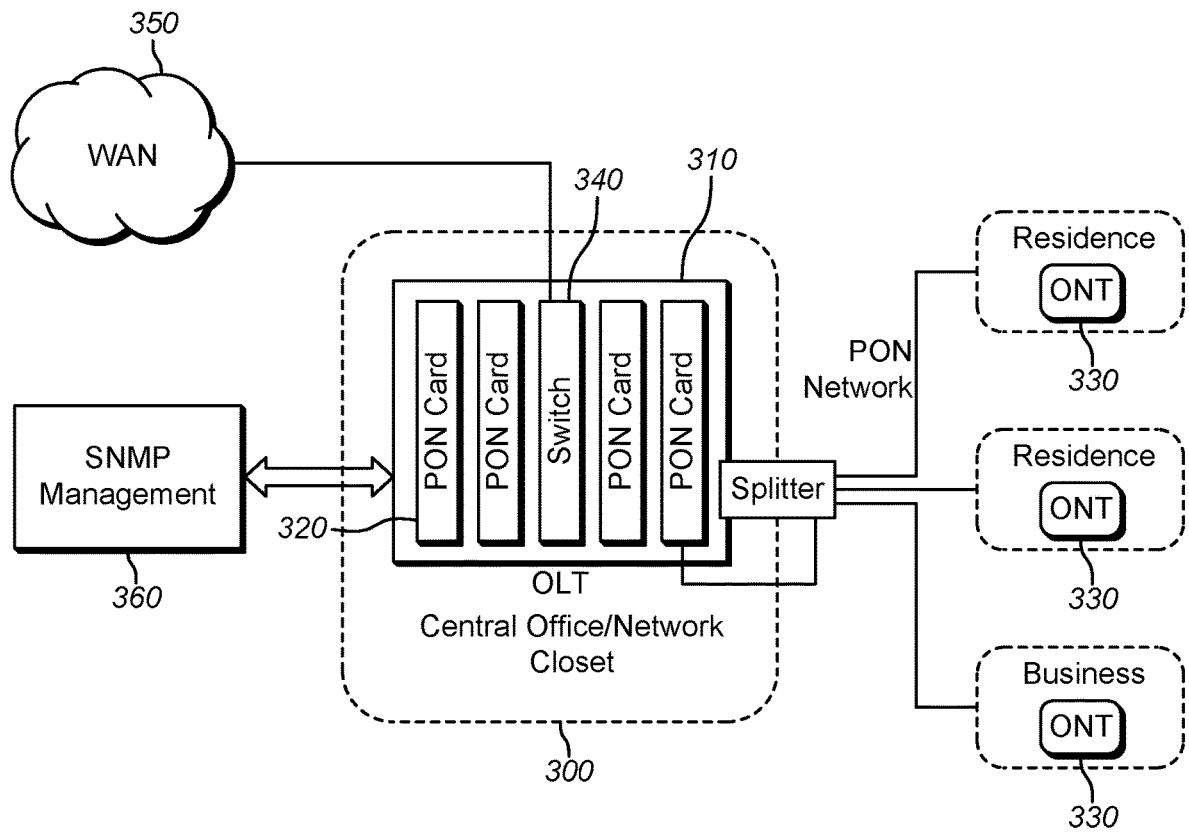
FIG. 3 illustrates an OLT with PON cards and a switch using SNMP management.

Referring to FIG. 3, a core network 300 typically includes an OLT 310. The OLT 310 includes a set of PON cards 320 that are detachably interconnected with a backplane of the OLT 310. Each of the PON cards 320 includes a set of ports thereon that are interconnected with the optical distribution network (e.g., "PON Network") to a set of ONTs 330. The PON cards 320 typically include optical transmitters to transmit signals through the optical fibers and the PON cards 320 typically include optical sensors to receive signals from the optical fibers. The OLT 310 includes a PON switch 340 that provides an interconnection between the PON cards 320 and a wide area network 350, such as the Internet.

Traditionally, a simple network management protocol (SNMP) is used for collecting and organizing management data about the OLT 310 and the ONTs 330 and for modifying that information to change device behavior. SNMP exposes management data in the form of variables of the managed systems organized in a management information database which describes the system status and configuration. These variables can then be remotely queried by managing applications. A SNMP Management 360 may be used to query and collect such data using SNMP for the OLT 310 and the ONTs 330. However, SNMP lacks a defined discovery process, varies substantially from device to device, and lacks a standard security and commit mechanisms making it burdensome to use when scaling to thousands of devices to maintain an overall status of the network.

A network configuration protocol (NETCONF) is a management protocol that provides mechanisms to install, manipulate, manage, and delete the configuration of network devices. NETCONF operations are realized on top of a remote procedure call (RPC) layer. The NETCONF protocol uses an Extensible Markup Language or JavaScript Object Notation (e.g., XML/JSON) based data encoding for the configuration data as well as the protocol messages. The protocol messages are preferably exchanged on top of a secure transport protocol.

Figure 4:
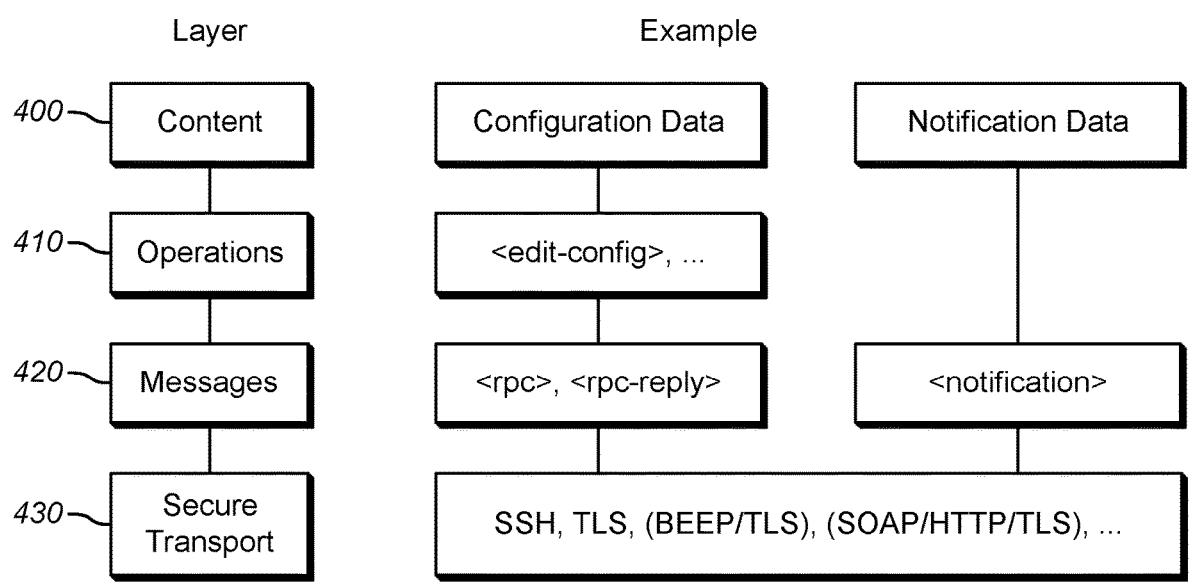
FIG. 4 illustrates a NETCONF based architecture.

Referring to FIG. 4, NETCONF may be conceptually partitioned into four layers, namely, a content layer 400, an operations layer 410, a messages layer 420, and a secure transport layer 430.

To more effectively use the NETCONF protocol, it is desirable to include a data modelling language to define the data models manipulated by the NETCONF protocol. One such data modelling language is a YANG (Yet Another Next Generation) language. YANG is a modular language representing data structures in a XML or JSON tree format. YANG includes a number of built-in data types and application specific data types can be derived from the built-in data types. Thus, YANG models may be effectively used for configuration and state data of network elements. Use of the YANG models as defined in a particular standard, ensure interoperability between different devices.

A YANG model, such as described in RFC7950 incorporated by reference herein in its entirety, may be used for alarm management in a PON network, such as described in RFC8632 incorporated by reference herein in its entirety, for OLTs and ONTs.

Figure 5:
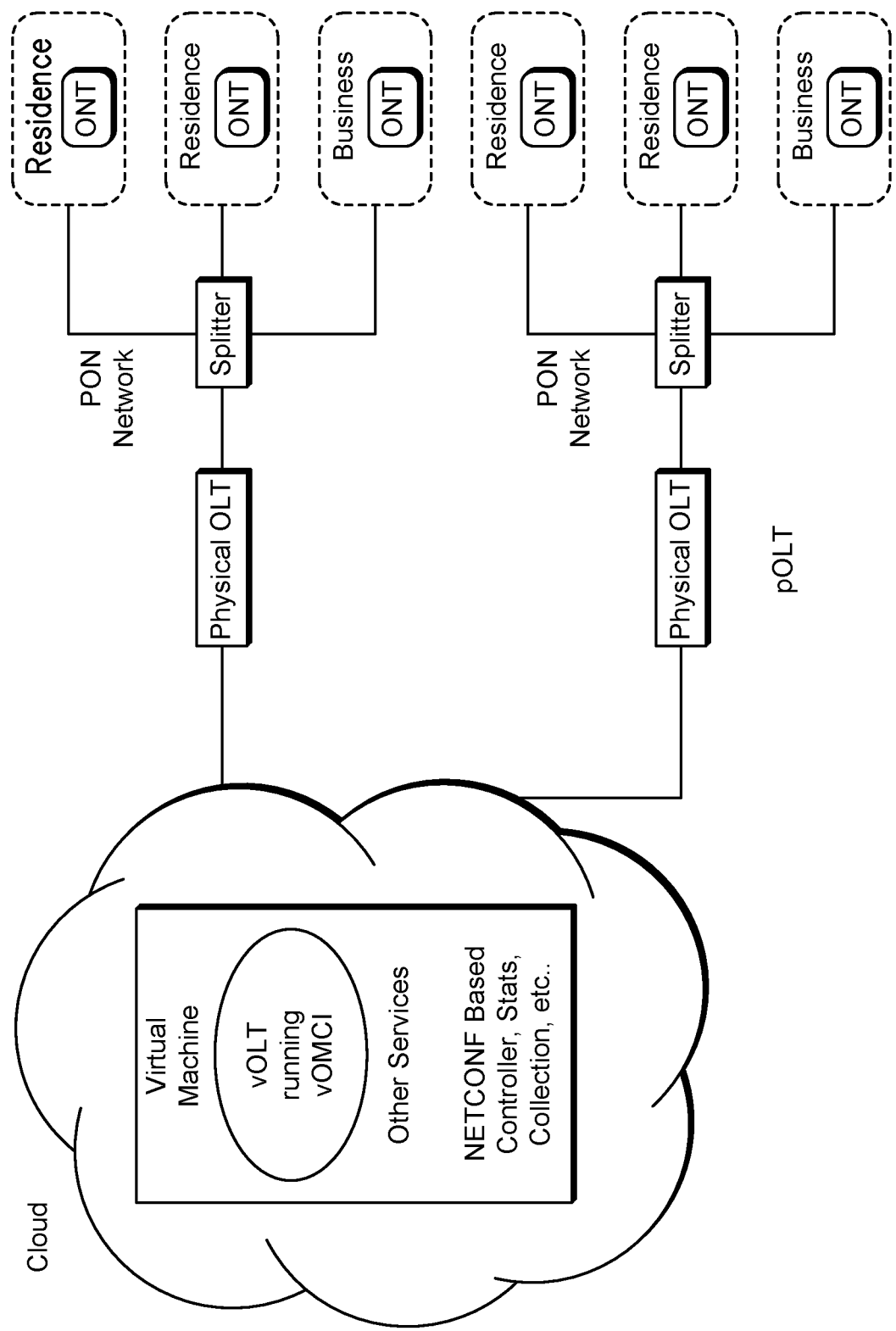
FIG. 5 illustrates a PON system with a virtual machine running vOLT running vOMCI.

Referring to FIG. 5, an exemplary system that includes a virtual OLT with underlying physical OLTs and ONTs is illustrated. With the virtualization of portions of a PON system, the network has a modified architecture. The chassis based OLTs may be replaced with many smaller capacity shelf OLTs, if desired. Some software services that were previously executed on a chassis controller and/or PON cards may be moved to cloud software services (e.g., a server) and be associated with plural physical OLTs. One such layout may include virtual services as part of cloud software services and physical devices with one virtual OLT (vOLT) managing, at least in part, N number of physical OLTs.

For example, a virtual OLT (vOLT) may include OLT Management Functions associated with the OLT that executes outside of physical OLT hardware.

For example, a virtual OMCI (vOMCI) may include OMCI software than executes outside of physical OLT hardware.

For example, a physical OLT (pOLT) may be a combination of hardware and software that implements a physical OLT terminal and network to network interface.

For example, the vOMCI may execute software referred to as OMCI (ONU management and control interface) that traditionally executes on the physical OLT. The vOLT and vOMCI are de-coupled from the physical OLT and execute in the software cloud on a server while communicating with the physical OLT. Both the physical OLT and the vOLT support NETCONF messaging using a YANG model.

Figure 6:
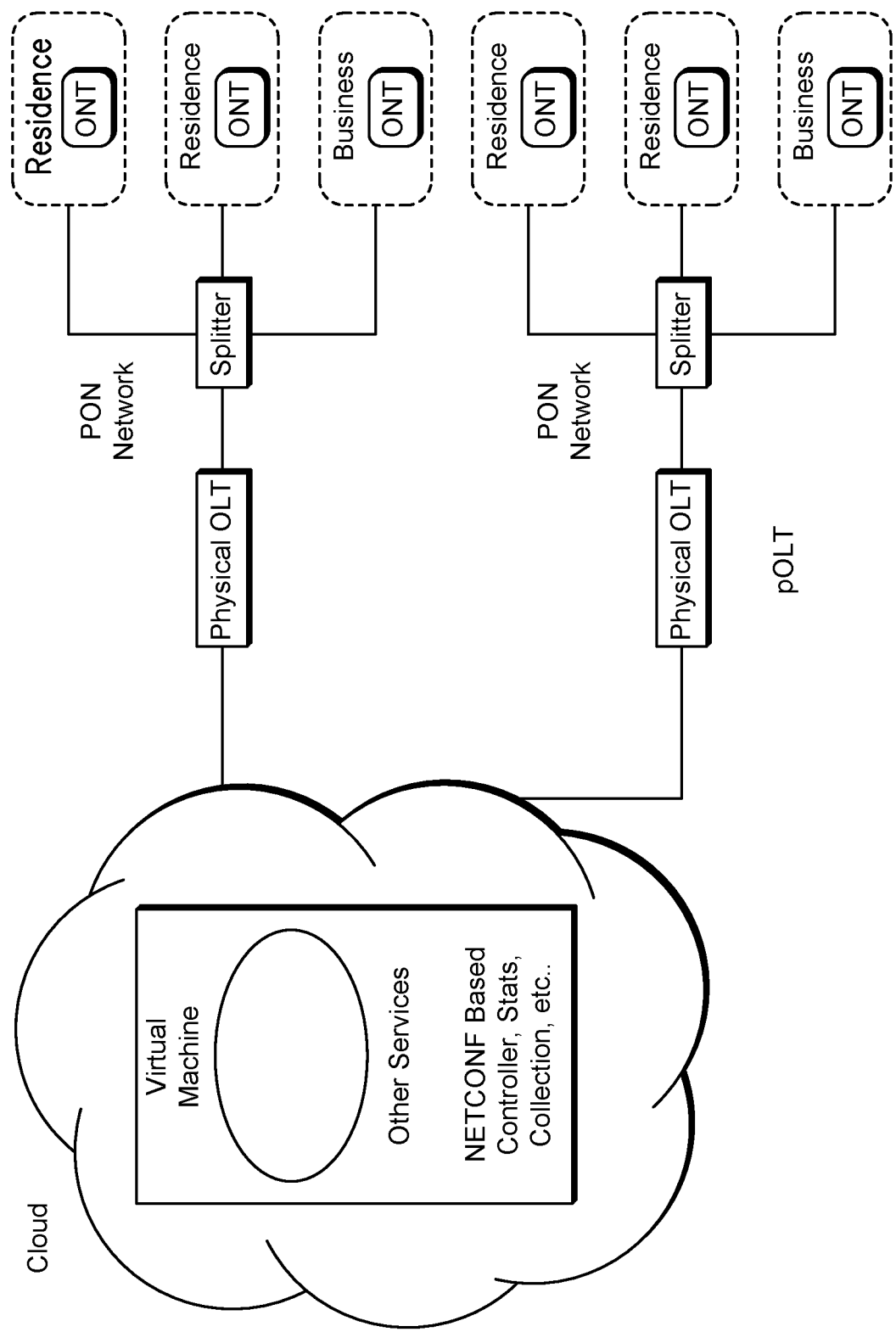
FIG. 6 illustrates a PON system with virtual machine without vOLT and vOMCI with physical OLTs.

Referring to FIG. 6, a modified exemplary system that includes a virtual OLT with underlying physical OLTs and ONTs is illustrated. The system still includes the cloud computing for selected services of the PON system, but for example, the OMCI may execute on each physical OLT and thus there is no need to include a virtual OLT. However, software executing in the cloud computing still preferably manages all the OLTs using NETCONF using a YANG model.

It is often desirable for the OLT to receive alarm information reported by an optical network terminal (ONT) and searching a pre-configured alarm monitoring template associated with the ONT. In response to the searching, the OLT may reset the alarm, and report or discard the alarm information on the basis of the alarm level.

On a chassis-based OLT, an alarm service would execute on the chassis using a SNMP interface to send unrequested notifications (SNMP traps) to a controller. The OLT may monitor physical changes to the hardware such as link loss, environment alarms, or transmission related errors. An alarm controller could connect to the chassis controller using SNMP to listen for traps. In this environment, the chassis itself manages its own alarms and propagates them to a management system using SNMP.

With the limitations and complexities of managing a large network of SNMP based devices, it is preferable to use NETCONF to manage alarms. More preferably, it is desirable to employ NETCONF using YANG models that are more self-referential in design which provides more robust network management and automation capabilities over SNMP. One model to define YANG for alarm management is described in RFC8632, incorporated by reference herein in its entirety. The YANG model based alarm supports alarm notifications which are expected to be sent by network devices as messages and collected by a controller subscribed to such messages. In many cases, some of the network devices where alarm monitoring is desirable may not support using NETCONF messaging with RFC8632 YANG models or may not support NETCONF messaging at all.

An exemplary alarm architecture suitable for an architecture that includes virtual PON services may include a mixture of virtual and physical components, each of which may triggers alarms or system events. The PON entities each preferably support NETCONF, and more preferably support NETCONF together with a YANG model. An example of some alarm conditions in a cloud based PON or other network equipment topology may include one or more of the following:

(1) A virtual machine on a cloud server running PON related software services is down which is detected by a cloud software service which does not understand NETCONF.

(2) A physical cloud computing server running PON related software services is down which is detected by a cloud software service which does not understand NETCONF.

(3) A physical component detects a network link is physically disconnected. This notification may be propagated employing NETCONF using the alarm YANG model or some other model such as an interface model.

(4) A physical or virtual component detects an error rate for an interface has exceeded a threshold. This notification may be propagated employing NETCONF using the alarm YANG model or some other model such as an interface model.

(5) A physical OLT is detected as down by a virtual software component of a cloud software service. This notification may be propagated employing NETCONF using the alarm YANG model or some other model such as an interface model.

(6) A physical OLT detects a physical ONT enclosure at a subscriber is compromised by being opened. This notification may be propagated employing NETCONF using the alarm YANG model or some other model such as an interface model.

As a general matter, any of the physical and/or virtual components of the network may detect an alarm-based event and generate a notification to any physical and/or virtual component of the network. This notification may be propagated employing NETCONF using the alarm YANG model (RFC8632), propagated employing NETCONF using another YANG model (not RFC8632), and/or propagated using some other model such as an interface model.

Preferably, the alarms are collected and propagated employing NETCONF messages using the alarm YANG model onto another messaging system using a particular protocol such as web socket or message bus (e.g., KAFKA).

Figure 7:
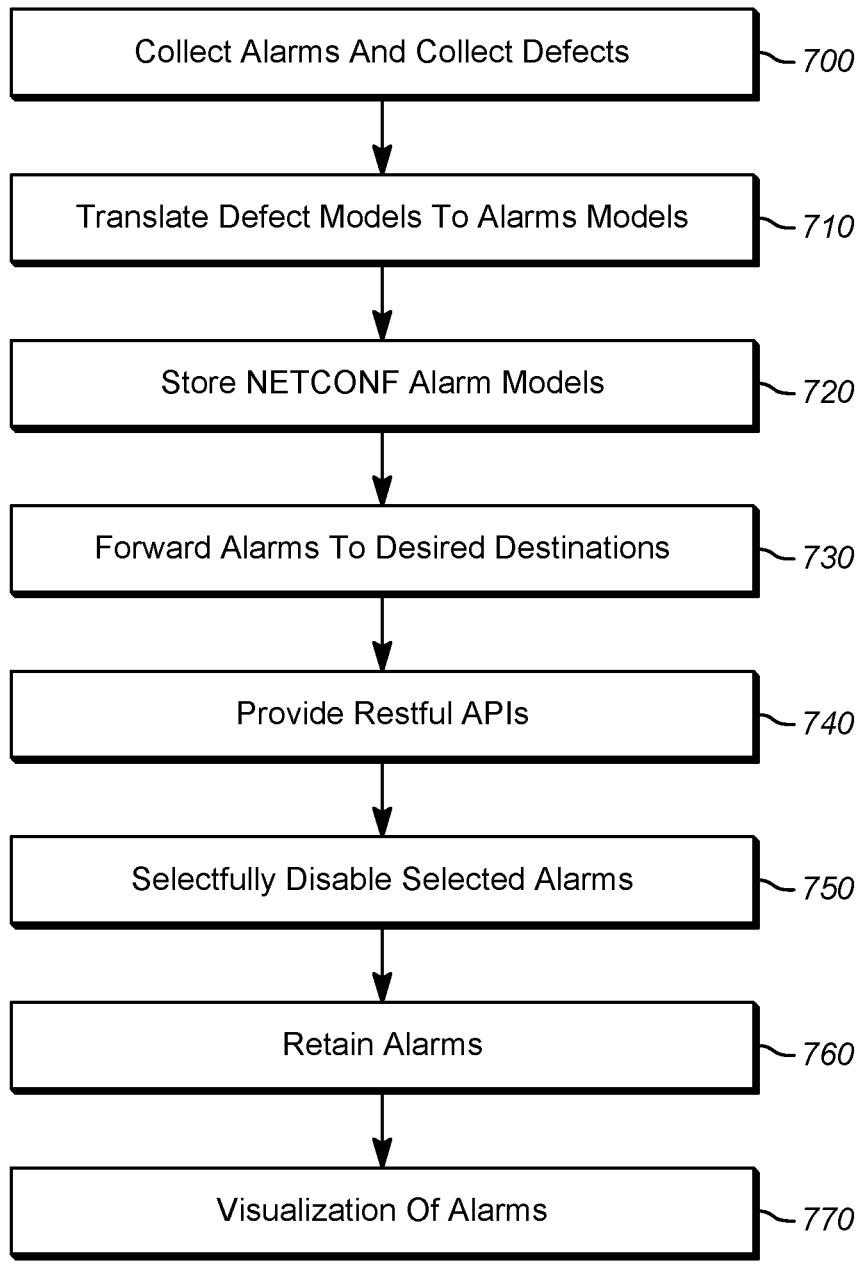
FIG. 7 illustrates alarm signalling for an alarm management system.

Referring to FIG. 7, the architecture of the alarm system with an alarm manager should facilitate a large-scale cloud based virtual PON system. The alarm manager acts as a central alarm aggregator for other network components relative to the PON based virtual and physical based system. By way of example, the alarm manager may exist together with a domain controller, a domain manager, and/or an alarm management suite. The alarm manager may support one or more of the following.

(1) The alarm management system may collect and aggregate (1) NETCONF using alarm YANG models and (2) NETCONF using a defect YANG models, either of which are from any of the OLTs and/or ONTs in the system 700. The NETCONF using the alarm YANG models are preferably complaint with RFC8632. The NETCONF using the defect YANG models are preferably not compliant with RFC8632. The NETCONF using the defect YANG models may be complaint with Broadband Forum, YANG, TR-355, incorporated by reference herein in its entirety. For example, bbf-xpon-defects.yang is a NETCONF YANG model which handles PON defects such as, (1) loss of signal, (2) loss of physical layer operation administration and maintenance on an ONU (loss of PLOAM), (3) loss of ONT management control interface channel on an ONU (loss of OMCI); and (4) signal Degrade on an ONU.

For example, the notifications for PON defects may be YANG interface notifications which point to the "bbf-xpon-defects.yang" model. For example, notification for a channel termination (used by the ONU) clearing loss of signal maybe as follows:

```
<notification xmlns="urn:ietf:params:xml:ns:netconf:notification:1.0"> // A YANG
notification
    <eventTime>2021-12-15T06:44:29+00:00</eventTime>
    <interfaces-state xmlns="urn:ietf:params:xml:ns:yang:ietf-interfaces"> // IETF
interfaces notification
        <interface>
            <name>CT_3</name>
            <channel-termination xmlns="urn:bbf:yang:bbf-xpon">
                <defect-state-change>
                    <defect>
                        <type xmlns:bbf-xpon-def="urn:bbf:yang:bbf-xpon-defects">bbf-xpon-
def:los</type> // type of defect is a bbf-xpon-def
                        <state>cleared</state>
                    </defect>
```

```
        <last-change>2021-12-15T06:44:29Z</last-change>
      </defect-state-change>
    </channel-termination>
   </interface>
   <detected-registration-id xmlns="urn:bbf:yang:bbf-xpon-onu-states">cpc1-
fakeaspen1--</detected-registration-id>
  </interfaces-state>
 </notification>
```

(2) The alarm management system may translate NETCONF using the defect YANG models that are not compliant with RFC8632 into NETCONF using the alarm YANG models complaint with RFC8632 710. In this manner, all the NETCONF YANG models are consistent with one another using the same common alarm model representation.

(3) The alarm management system may store and manage compliant RFC8632 NETCONF YANG alarms and translated RFC8632 NETCONF YANG alarms 720 in a suitable database.

(4) The alarm management system may forward the alarms to desired destinations 730 for further use by a messaging system (KAFKA, gRPC, etc.,) or web socket interface.

(5) The alarm management system may provide RESTful APIs 740 for controlling alarm viewing and management functions defined in RFC8632, or otherwise.

(6) The alarm management system may enable a user to selectively disable selected alarms 750 of the PON system.

(7) The alarm management system maintains long term retention of alarms 760 for historical data purposes.

(8) The alarm management system may provide visualization of alarms 770 through a graphical user interface on a computer.

(9) The alarm management system may include a list of supported alarms so that alarms not consistent with the supported alarms may be discarded, as desired.

Figure 8:
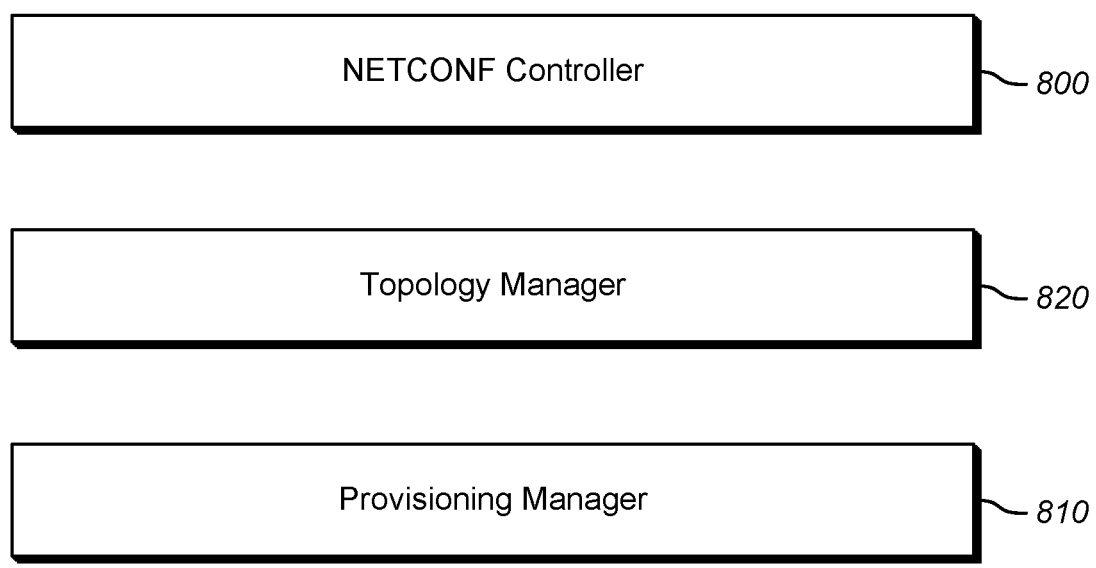
FIG. 8 illustrates mangers for an alarm management system.

Referring to FIG. 8, a set of services may be included to expand the capability of the alarm management system.

The alarm management system may include a NETCONF controller 800 which manages connections to NETCONF devices.

The alarm management system may include a provisioning manager 810 that manages provisioning of NETCONF devices through the NETCONF controller.

The alarm management system may include a topology manager 820 that reports the network topology of the PON system.

Figure 9:
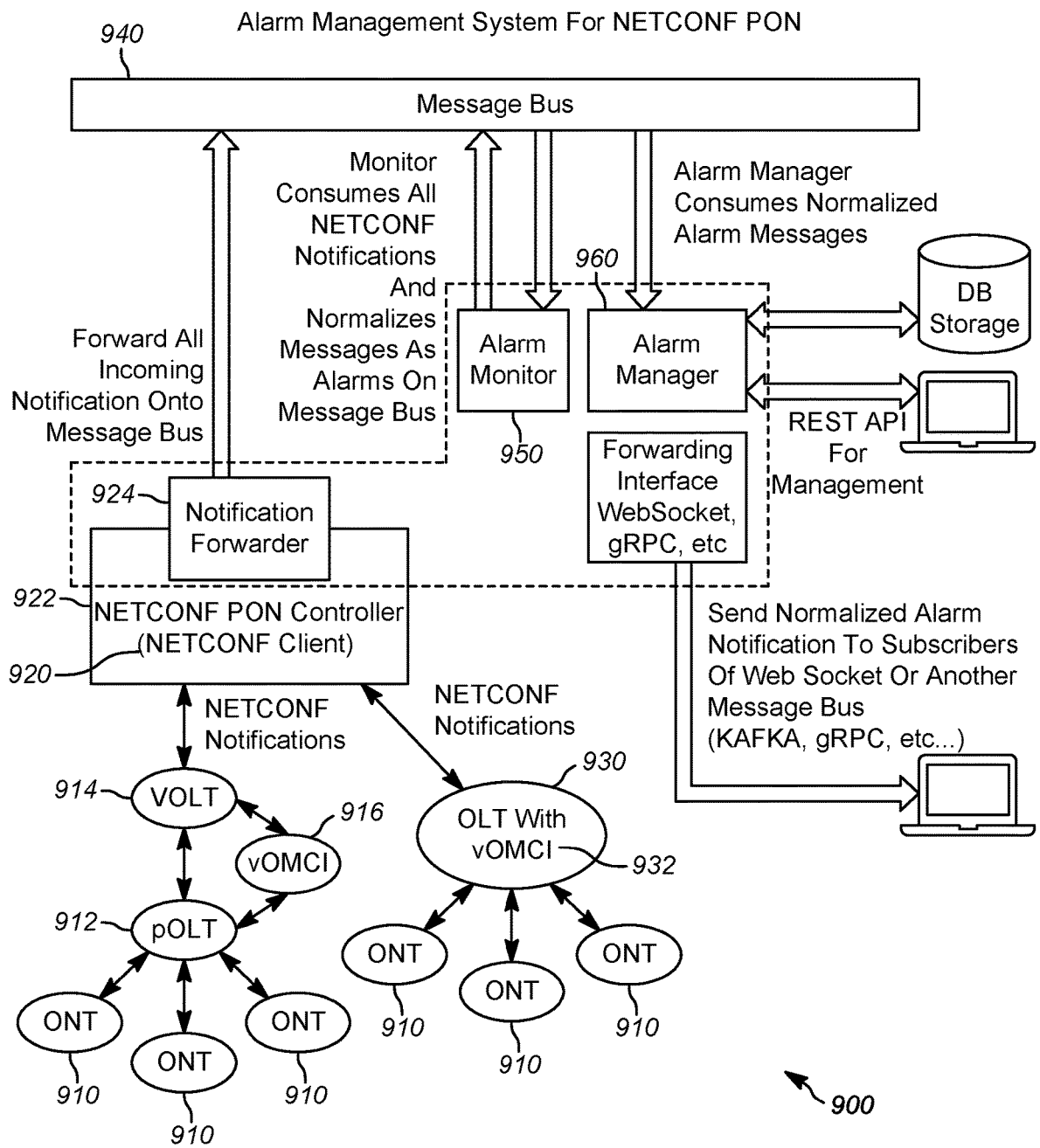
FIG. 9 illustrates an alarm management system for NETCONF PON.

Referring to FIG. 9 an exemplary alarm management system 900 employing NETCONF for PON is illustrated. The alarm management system 900 includes a plurality of ONTs 910. If desired, the ONTs 910 may be interconnected with one or more optical fibers to a physical OLT 912. The communication between the ONTs 910 and the physical OLT 912 employ a PON protocol. The physical OLT 912, using its north bound interface, is interconnected to a cloud-based server which operates a vOLT service 914 and a vOMCI service 916. The vOLT service 914 and the vOMCI service 916 are in communication with the physical OLT 912 and a NETCONF client 920 which is part of a NETCONF PON Controller 922. The interconnection between the vOLT 914 and/or the vOMCI 916 and the NETCONF client 920 employs NETCONF notifications, preferably using a YANG model.

If desired, the ONTs 910 may be interconnected with one or more optical fibers to a physical OLT 930. The communication between the ONTs 910 and the physical OLT 930 employ a PON protocol. The physical OLT 930 includes a vOMCI service 932. The physical OLT 930 is in communication, using its northbound interface, to the NETCONF client 920 which is part of the NETCONF PON Controller 922. The NETCONF client 920 preferably receives Ethernet based TCP protocol. The interconnection between the physical OLT 930 and the NETCONF client 920 employs NETCONF notifications, preferably using a YANG model.

The NETCONF client 920 is a centralized NETCONF client, for a plurality of OLTs, which holds connections to virtual OLT(s) and/or physical OLTs. The underlying ONT notifications pass through the virtual OLTs and/or physical OLTs to the NETCONF client 920. The NETCONF PON controller 920 creates subscriptions using NETCONF remote procedure calls such that NETCONF notifications are sent by the OLTs to the NETCONF client 920. The ONTs subtend from the respective OLTs and as part of PON network using NETCONF where ONT notifications are provided to the NETCONF client 920 via the respective OLT.

The NETCONF controller 922 includes a notification forwarder 924. All, or a selected set of, received notifications by the NETCONF client 920 are forwarded to a message bus 940. The NETCONF client 920 has information regarding which of the OLTs and/or ONTs provided the notifications and includes such information in a wrapper included with the YANG notification before forwarding it to the message bus 940. Referring to FIG. 10, an exemplary notification wrapper for a normalized alarm message is illustrated.

Each of the notifications that are consumed by the NETCONF client 920, or a selected subset thereof, are forwarded on the message bus 940. The message bus 940 is preferably configured to include the capability of handling the maximum number of notifications that the alarm management system could produce. Any messaging technique (e.g., gRPC, KAFTA, etc.) may be used to transport the notifications.

An alarm manger system includes an alarm monitor 950 and an alarm manager 960. The alarm monitor 950 monitors the message bus 940 for notifications. The alarm monitor 950 normalizes alarms and/or notifications into alarms, that are not already in the form of alarm YANG models for RFC8632, to YANG models for RFC8632. The alarm monitor 950 have knowledge of what type of defect and/or alarm notifications can be translated into YANG models for RFC8632. The translation knowledge may be maintained in a database, if desired. The alarm monitor 950 may also include a polling mechanism to collect alarms and/or notifications that do not support NETCONF. The alarm monitor 950 provides a single collection point for all of the defects and/or alarms. The alarm monitor 950 forwards each of the alarm YANG models and/or other defects (if any) on the message bus 940. The alarm monitor 950 may include a web socket interface to forward the normalized alarm notifications to another computer, such as by a subscription system.

The alarm manager 960 consumes all the normalized alarm messages and/or other defects (if any) from the message bus 940. The alarm manager 960 processes all the message and stores the alarm data in a data store. The alarm data is modelled after RFC8632 Alarm YANG and is kept in the data store until being purged. For example, the alarm manager 960 may maintain an alarm table of all supported alarms implemented using a comma separated file, if desired. The alarm table may be modified, via REST API such that alarms can be disabled, or certain alarm properties such as alarm severity may be overwritten before being stored in the data store. The alarm table may be viewed, via REST API such that the alarms may be viewed in some manner.

The alarm manager 960 forwards each of the alarm YANG models and/or other defects (if any) on the message bus 940. The alarm manager 960 may include a web socket interface to forward the normalized alarm notifications to another computer, such as by a subscription system.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An alarm management system for a passive optical network comprising:
   (a) said alarm management system receiving (1) a first plurality of Network Configuration Protocol (NETCONF) alarm Yet Another Next Generation (YANG) model messages having an organization that are compliant with RFC8632 from one or more optical network terminals and/or one or more optical line terminals and (2) receiving a second plurality of Network Configuration Protocol (NETCONF) defect YANG model messages having an organization that are not complaint with RFC 8632 from one or more optical network terminals and/or one or more optical line terminals;
   (b) said alarm management system forwarding said first plurality of messages and said second plurality of messages to a message bus;
   (c) said alarm management system receiving said first plurality of messages and said second plurality of messages from said message bus and translating each of said defect YANG model messages not complaint with RFC 8632 to respective said alarm YANG model messages complaint with RFC 8632;
   (d) said alarm management system forwarding said translated said defect YANG model messages not complaint with RFC 8632 to said respective said alarm YANG model messages complaint with RFC 8632 to said message bus;
   (e) said alarm management system receiving said forwarded said translated said defect YANG model messages from said message bus and maintaining said translated said defect YANG model messages in a data store;
   (f) said alarm management system maintaining said first plurality of messages in said data store;
   (g) said alarm management system provides data from said data store upon request from a computer system outside said alarm management system.

2. The alarm management system of claim 1 where said defect YANG messages are compliant with TR-355.

3. The alarm management system of claim 1 wherein said NETCONF is included on top of a remote procedure call (RPC) layer.

4. The alarm management system of claim 3 wherein said NETCONF uses an extensible markup language and/or JavaScript object notation based data encoding.

5. The alarm management system of claim 1 wherein said at least one of said optical line terminals includes a virtual optical line terminal.

6. The alarm management system of claim 1 wherein said at least one of said optical network terminals includes a virtual optical network terminal.

7. The alarm management system of claim 1 wherein said messaging bus is a KAFKA bus.

8. The alarm management system of claim 1 wherein data in said data store is modified.

* * * * *